US012666394B2

(12) United States Patent
Li et al.

(10) Patent No.: US 12,666,394 B2
(45) Date of Patent: Jun. 23, 2026

(54) PAGING PROCESSING METHOD AND APPARATUS, COMMUNICATION DEVICE, AND STORAGE MEDIUM

(71) Applicant: BEIJING XIAOMI MOBILE SOFTWARE CO., LTD., Beijing (CN)

(72) Inventors: Yanhua Li, Beijing (CN); Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 314 days.

(21) Appl. No.: 18/288,569

(22) PCT Filed: Apr. 29, 2021

(86) PCT No.: PCT/CN2021/091152
§ 371 (c)(1),
(2) Date: Oct. 26, 2023

(87) PCT Pub. No.: WO2022/226929
PCT Pub. Date: Nov. 3, 2022

(65) Prior Publication Data
US 2024/0214985 A1 Jun. 27, 2024

(51) Int. Cl.
H04W 68/00 (2009.01)
H04W 68/02 (2009.01)

(52) U.S. Cl.
CPC ................................... H04W 68/02 (2013.01)

(58) Field of Classification Search
CPC ....... H04W 68/02; H04W 76/28; Y02D 30/70
See application file for complete search history.

(56) References Cited

U.S. PATENT DOCUMENTS

| | | | |
|---|---|---|---|
| 11,012,971 B2 | 5/2021 | Tang | |
| 11,178,634 B2 | 11/2021 | Tang | |
| 2021/0058892 A1 | 2/2021 | Tang | |
| 2021/0127350 A1 | 4/2021 | Tang | |
| 2021/0160814 A1 | 5/2021 | Wang et al. | |
| 2022/0279479 A1* | 9/2022 | Nader | H04W 68/02 |
| 2023/0309061 A1* | 9/2023 | Lyu | H04W 76/20 |
| 2024/0214985 A1* | 6/2024 | Li | H04W 76/28 |
| 2024/0214986 A1* | 6/2024 | Li | H04W 68/00 |

FOREIGN PATENT DOCUMENTS

| | | |
|---|---|---|
| CN | 109691194 A | 4/2019 |
| CN | 109792712 A | 5/2019 |
| CN | 110574456 A | 12/2019 |

(Continued)

OTHER PUBLICATIONS

International Search Report of PCT/CN2021/091152 dated Jan. 20, 2022 with English translation, (4p).

(Continued)

*Primary Examiner* — Md K Talukder
(74) *Attorney, Agent, or Firm* — Arch & Lake LLP; Hao Tan; Shen Wang

(57) ABSTRACT

Provided in the present disclosure is a paging processing method and apparatus, a communication device, and a non-transitory computer storage medium. The paging processing method executed by a terminal device in an inactive state may include: monitoring a paging message on the basis of paging group information.

18 Claims, 5 Drawing Sheets

(56) References Cited

FOREIGN PATENT DOCUMENTS

| | | |
|---|---|---|
| CN | 111294892 A | 6/2020 |
| WO | 2021018531 A1 | 2/2021 |

OTHER PUBLICATIONS

3GPP TS 38.304 V17.6.0 (Sep. 2023) Technical Specification, 3rd Generation Partnership Project; Technical Specification Group Radio Access Network; NR; User Equipment (UE) procedures in Idle mode and RRC Inactive state (Release 17), (51p).

* cited by examiner

Paging processing
apparatus

Sending
module 210

804                          802          800

Memory          Processing
component

806

Power
component          Processor 808                                        820

Multimedia
component

810

Audio
componen

816

Communication
component

814

Sensor
component

Input/output
interface

812

PAGING PROCESSING METHOD AND APPARATUS, COMMUNICATION DEVICE, AND STORAGE MEDIUM

CROSS-REFERENCE TO RELATED APPLICATION

The application is a U.S. national phase of International Application No. PCT/CN2021/091152 filed on Apr. 29, 2021, the entire content of which is incorporated herein by reference for all purposes.

TECHNICAL FIELD

The present disclosure relates to the field of wireless communication technologies but is not limited to the field of wireless communication technologies, and in particular, relates to a paging processing method and apparatus, a communication device and a storage medium.

BACKGROUND

The connection relationship between the terminal device, also known as User Equipment (UE), and the network side may be divided into: a Radio Resource Control (RRC) connected state (abbreviated as a connected state) and a disconnected state. The disconnected state includes: an idle state that is visible to the core network on the network side, and an inactive state that is only visible to the access network, that is, invisible to the core network (CN) device.

If the terminal device is currently in the idle state, but there is a terminal device for communication, the network side may perform CN device paging. If the terminal device is currently in the inactive state, and it is needed to wake up the terminal device to communicate, the access network may deliver a radio access network (access network device) paging.

The terminal device monitors the paging message on the paging occasion (PO), thereby exiting the disconnected state and entering the connected state.

Under normal circumstances, if the terminal device is in the inactive state (i.e., the inactive-state terminal device), it will not receive the CN paging, but it is not excluded that the CN device needs to page the inactive-state terminal device. With the development of communication technology, broadband communication or ultra-broadband communication has appeared.

SUMMARY

Embodiments of the present disclosure provide a paging processing method and apparatus, a communication device, and a storage medium.

A first aspect of the embodiments of the present disclosure provides a paging processing method, where a terminal device monitors a paging message according to paging group information, where the terminal device is in an inactive state.

A second aspect of the embodiments of the present disclosure provides a paging processing method, where the method includes:

sending a paging message according to paging group information.

A third aspect of the embodiments of the present disclosure provides a paging processing apparatus, where the apparatus includes:

a monitoring module, configured to monitor a paging message according to paging group information; where the terminal device is in an inactive state.

A fourth aspect of the embodiments of the present disclosure provides a paging processing apparatus, where the apparatus includes:

a sending module, configured to send a paging message according to paging group information.

A fifth aspect of the embodiments of the present disclosure provides a communication device, including a processor, a transceiver, a memory, and an executable program stored on the memory and capable of being run by the processor, where the processor executes the paging processing method provided by the first aspect or the second aspect when running the executable program.

A sixth aspect of the embodiments of the present disclosure provides a computer storage medium, where an executable program is stored in the computer storage medium; after the executable program is executed by a processor, the paging processing method provided by the first aspect or the second aspect can be implemented.

According to the technical solutions provided by the embodiments of the present disclosure, when the terminal device is in the inactive state, it can monitor the paging message according to the paging group information, so that the terminal device only needs to monitor the paging message of the paging group where it belongs, instead of monitoring the paging messages of all paging groups on the entire PO, thereby reducing the power consumption of the terminal device due to monitoring all the paging groups, and prolonging the standby time of the terminal device.

It is to be understood that the foregoing general description and the following detailed description are exemplary and explanatory only and are not restrictive of the embodiments of the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the embodiments of the present disclosure.

DETAILED DESCRIPTION

Reference will now be made in detail to one or more embodiments, examples of which are illustrated in the accompanying drawings. The following description refers to the accompanying drawings in which the same numbers in different drawings represent the same or similar elements unless otherwise represented. The implementations set forth in the following description of one or more embodiments do not represent all implementations consistent with the embodiments of the present disclosure. Instead, they are merely examples of apparatuses and methods consistent with aspects related to the embodiments of the present disclosure as recited in the appended claims.

The terms used in the embodiments of the present disclosure are for the purpose of describing particular embodiments only and are not intended to limit the embodiments of the present disclosure. As used in the embodiments of the present disclosure and the appended claims, the singular forms "a/an," and "the" are intended to include the plural forms as well, unless the context clearly dictates otherwise. It should also be understood that the term "and/or" as used herein refers to and includes any or all possible combinations of one or more of the associated listed items.

It should be understood that although the terms first, second, third, etc. may be used in the embodiments of the present disclosure to describe various pieces of information, such information should not be limited by these terms. These terms are only used to distinguish the same type of information from each other. For example, the first information may also be referred to as second information, and similarly, the second information may also be referred to as the first information, without departing from the scope of the embodiments of the present disclosure. Depending on the context, the word "if" as used herein can be interpreted as "at the time of" or "when" or "in response to determining."

Figure 1:
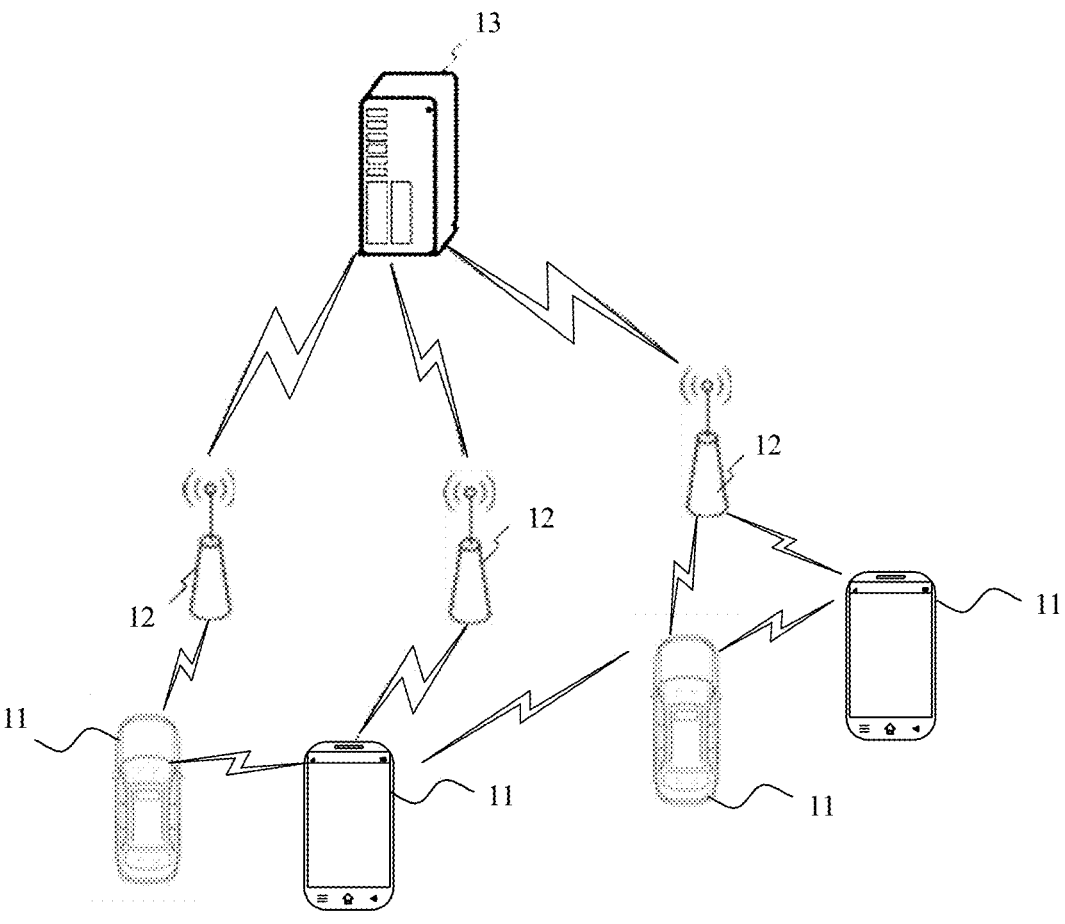
FIG. 1 is a schematic structural diagram of a wireless communication system according to an embodiment.

FIG. 1 shows a schematic structural diagram of a wireless communication system provided by an embodiment of the present disclosure. As shown in FIG. 1, the wireless communication system is a communication system based on cellular mobile communication technology, and the wireless communication system may include: several terminal devices 11 and several access devices 12.

The terminal device 11 may be a device that provides voice and/or data connectivity to the user. The terminal device 11 can communicate with one or more core networks via a radio access network (access network device). The terminal device 11 may be an Internet of things (IOT) terminal device, such as a sensor device, a mobile phone (or called a "cellular" phone), and a computer with the IoT terminal device, for example, it may be a fixed, portable, pocket-sized, handheld, computer-built or vehicle-mounted apparatus. For example, it may be a station (STA), a subscriber unit, a subscriber station, a mobile station, a mobile, a remote station, an access point, a remote terminal device (remote terminal), an access terminal device (access terminal), a user apparatus (user terminal), a user agent, a user device, or a user terminal device (user equipment). Alternatively, the terminal device 11 may also be a device of an unmanned aerial vehicle. Alternatively, the terminal device 11 may also be a vehicle-mounted device, for example, a trip computer with a wireless communication function, or a wireless communication device connected to an external trip computer. Alternatively, the terminal device 11 may also be a roadside device, for example, it may be a street light, a signal light, or other roadside devices with a wireless communication function.

The access device 12 may be a network-side device in the wireless communication system. The wireless communication system may be a fourth generation mobile communication (the 4th generation mobile communication, 4G) system, also known as a long term evolution (LTE) system; or, the wireless communication system may also be a 5G system, also known as a new radio (NR) system or a 5G NR system. Alternatively, the wireless communication system may also be a next-generation system of the 5G system. Among them, the access network in the 5G system can be called NG-access network device (New Generation-Radio Access Network, a new generation of radio access network). Alternatively, it may be the MTC system.

The access device 12 may be an evolved access device (eNB) used in the 4G system. Alternatively, the access device 12 may also be an access device (gNB) that adopts a centralized and distributed architecture in the 5G system. When the access device 12 adopts the centralized and distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; the distributed unit is provided with a physical (PHY) layer protocol stack, and the specific implementation manner of the access device 12 is not limited in the embodiments of the present disclosure.

A wireless connection can be established between the access device 12 and the terminal device 11 through a wireless air interface. In different implementations, the wireless air interface is a wireless air interface based on the fourth generation mobile communication network technology (4G) standard; or, the wireless air interface is a wireless air interface based on the fifth generation mobile communication network technology (5G) standard, for instance, the wireless air interface is a new air interface; alternatively, the wireless air interface may also be a wireless air interface based on a next-generation mobile communication network technology standard of 5G.

In some embodiments, an End to End (E2E) connection may also be established between the terminal devices 11, for example, vehicle to vehicle (V2V) communication, vehicle to Infrastructure (V2I) communication and vehicle to pedestrian (V2P) communication in vehicle to everything (V2X) communication and other scenarios.

In some embodiments, the above wireless communication system may further include a network management device 13.

Several access devices 12 are connected to the network management device 13, respectively. The network management device 13 may be a core network device in the wireless communication system, for example, the network management device 13 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS), etc. The implementation form of the network management device 13 is not limited in the embodiments of the present disclosure.

Figure 2:
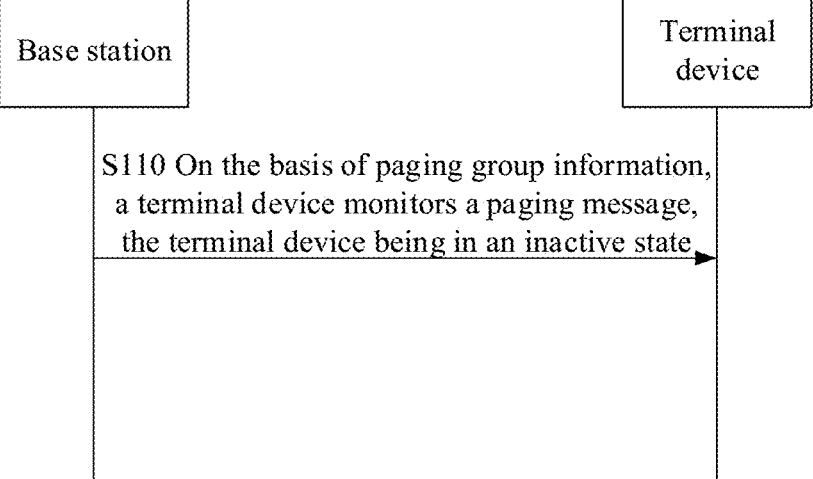
FIG. 2 is a schematic flowchart of a paging processing method according to an embodiment.

As shown in FIG. 2, an embodiment of the present disclosure provides a paging processing method, which may include the following steps.

In S110: the terminal device monitors a paging message according to paging group information, where the terminal device is in an inactive state.

The paging group information can be used to determine paging groups. Different paging groups may correspond to different paging sub-channels or different paging bandwidths. For example, one PO in a cell occupies a plurality of bandwidth parts (BWPs), and different BWPs can be used for different paging groups. For example, one paging channel may be divided into a plurality of paging sub-channels in the frequency domain. As such, different paging groups may correspond to different paging sub-channels.

In the embodiments of the present disclosure, considering the purpose of saving the power consumption of the terminal device, the paging message may be monitored according to the paging group information. In this way, the bandwidth that the terminal device needs to monitor when monitoring the paging message can be reduced, thereby reducing the power consumption of the terminal device.

For example, the terminal device may monitor the paging message on the paging sub-channel or BWP corresponding to the paging group in which the terminal device is located according to the paging group information.

Figure 3:
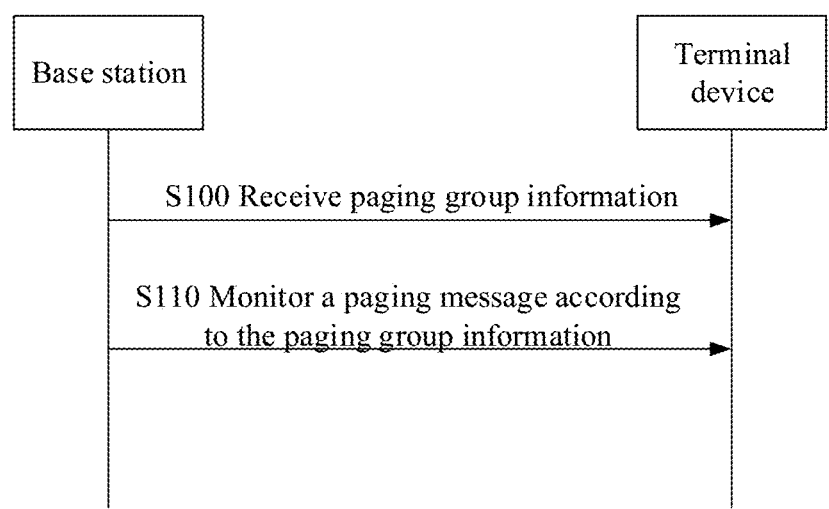
FIG. 3 is a schematic flowchart of a paging processing method according to an embodiment.

In an embodiment of the present disclosure, as shown in FIG. 3, the method may further include the following steps.

In S100: paging group information is received.

For example, the paging group information may be sent to the terminal device in advance by the network side. For example, the paging group information may be sent by the network side to the terminal device through a non-access stratum (NAS) message or an RRC message, or, sent to the terminal device through a broadcast message.

For example, during the connection release procedure of switching from the connected state to the idle state or the inactive state, the terminal device receives the RRC message with the paging assistance information, so that the paging assistance information is received without setting a dedicated message carrying the paging assistance information.

In the embodiments of the present disclosure, there are several ways for the terminal device to obtain the paging assistance information, and the specific implementation is not limited to any one of the foregoing examples. In some embodiments, in the case that the capability of the terminal device, the type of the terminal device and/or the business service supported by the terminal device are relatively fixed, the paging assistance information of the terminal device may be pre-written into the communication protocol, so the terminal device may determine the paging assistance information according to the protocol.

In the embodiments of the present disclosure, the paging message may include: a paging message for CN paging and/or a paging message for access network device paging. In the embodiments of the present disclosure, if the terminal device is in an idle state, then the idle-state terminal device monitors the paging message on the PO of the first type corresponding to the idle state according to the paging group information. If the terminal device is in the inactive state, the inactive-state terminal device monitors the paging message on the PO of the second type corresponding to the inactive state according to the paging group information. In short, whether the idle-state terminal device or the inactive-state terminal device monitors the paging message according to the paging group information, it is no longer necessary to monitor all the paging groups on the PO that needs to be monitored, thereby saving the power consumption of the terminal.

In other embodiments, the terminal device is currently in an inactive state, and an abnormal situation such as context loss occurs on the network side. At this time, the CN device on the network side may consider that the terminal device may enter the idle state. In the normal situation, the terminal device in the inactive state only requires monitoring the PO of the second type corresponding to the inactive state, for example, performing paging monitoring according to the paging group information for the inactive state. However, due to the introduction of the above abnormal situation, the CN device may page the terminal device, and the CN device paging the terminal device is carried out according to the paging configuration in the idle state. In order to reduce the situation where the CN device cannot page the inactive-state terminal device due to this abnormal situation, in the embodiments of the present disclosure, for the inactive-state terminal device, the paging message may be monitored on the PO of the first type and the PO of the second type according to the paging group information, respectively, which can reduce the paging failure rate of CN paging at the network side due to the abnormality when the terminal device is in the inactive state.

In one embodiment, the S110 may include: monitoring the paging message on the PO of the first type and the PO of the second type according to the paging group information. The PO of the first type and the PO of the second type may have an overlapping part in the time domain, or may not overlap in the time domain.

In the embodiments of the present disclosure, the PO of the first type may be a PO on which CN paging is monitored, and the second type of PO may be a PO on which access network device paging is monitored.

The PO of the first type and the PO of the second type may be different POs determined according to the CN paging cycle, the RAN paging cycle and the default paging cycle. As an embodiment, the PO of the first type is the PO corresponding to the core network (CN) device paging cycle; the PO of the second type is the PO corresponding to the radio access network (RAN) paging cycle or the PO corresponding to the default paging cycle.

For example, if {CN paging cycle, RAN paging cycle, default paging cycle} configured in the inactive state of the terminal device are {60, 10, 20} respectively, then the PO of the first type is the PO corresponding to the core network (CN) device paging cycle, that is, repeating periodically with 60 ms corresponding to 0 ms, 60 m, 120 ms . . . , and the PO of the second type is the PO corresponding to the access network device paging cycle, that is, repeating periodically with 10 ms corresponding to 0 ms, 10 ms, 20 ms . . . ; at this time, the PO of the first type and the PO of the second type have an overlapping part in the time domain.

As an embodiment, the PO of the first type is the PO corresponding to the core network (CN) device paging cycle; the PO of the second type is the PO corresponding to the default paging cycle.

For example, if {CN paging cycle, RAN paging cycle, and default paging cycle} configured in the inactive state of the terminal device are {60, 20, 10} respectively, then the PO of the first type is the PO corresponding to the CN paging cycle, i.e., repeating periodically with 60 ms corresponding to 0 ms, 60 m, 120 ms . . . , and the PO of the second type is the PO corresponding to the default paging cycle, that is, repeating periodically with 10 ms corresponding to 0 ms, 10 m, 20 ms . . . ; at this time, the PO of the first type and the PO of the second type have an overlapping part in the time domain.

As an embodiment, the PO of the first type is a specific PO selected according to one style among all POs; the PO of the second type is all POs. The specific PO here is part of the all POs. At this time, the pattern of the specific PO may be notified to the terminal device in advance by the network side or determined based on the protocol.

All POs here may include all POs determined by CN paging cycle, RAN paging cycle and default paging cycle.

For example, if {CN paging cycle, RAN paging cycle, default paging cycle} is configured in the inactive state of the terminal device, the paging monitoring is performed with a paging cycle of 10 ms, that is, all POs monitored by the terminal are periodically repeated with 10 ms corresponding to 0 ms, 10 m, 20 ms . . . . Assuming that the POs selected every 20 ms are used as the PO of the first type, then the PO of the first type periodically repeats with 20 ms corresponding to 0 ms, 20 m, 40 ms . . . , and at this time, the PO of the second type, i.e., all POs, repeat periodically with 10 ms corresponding to 0 ms, 10 m, 20 ms . . . .

As an embodiment, the PO of the first type is a specific PO selected from all POs according to one style; the PO of the second type is the remaining POs. At this time, the PO of the first type and the PO of the second type do not have an overlapping part in the time domain.

In some embodiments, the paging group information includes at least one of the following:

a grouping identity (ID), used to indicate the paging group where the terminal device is located;

a paging probability value, where the paging probability value has a corresponding relationship with the paging group; or a paging probability level, where the paging probability level has a corresponding relationship with the paging group.

In some embodiments, the paging group information is included in paging assistance information, where the paging assistance information further includes:

a paging cycle parameter, where the paging cycle parameter may include: the aforementioned CN paging cycle, RAN paging cycle and/or default paging cycle.

The grouping identity is a group identity that directly identifies the paging group.

If the paging group information carries the grouping identity, the terminal device directly determines the paging group it belongs to according to the grouping identity, and then monitors the paging message on the corresponding paging group.

The value range of the paging probability value may be any value between 0 and 1, and the paging probability value has a corresponding relationship with the paging group. Thus, if the paging group information is the paging probability value, after the terminal device receives the paging probability value, it monitors the paging message according to the paging group corresponding to the paging probability value.

In other embodiments, the paging group information may be a probability level, for example, the paging probability values between 0 and 1 are divided into a plurality of paging probability value intervals, and different paging probability value intervals correspond to different paging probability levels, then after receiving the paging probability level, the terminal device determines the paging group it belongs to according to the corresponding relationship between the paging probability level and the paging group, so as to monitor the paging message on the corresponding paging group on the PO.

For example, the paging probability levels may be at least two, and for example, the paging probability levels may be two, three, or four, or the like.

In some embodiments, the paging group information includes:

first group information for the idle-state terminal device; and second group information for the inactive-state terminal device.

For example, the first group information and the second group information may point to the same paging group, or may point to different paging groups.

In a word, in the embodiments of the present disclosure, in order to realize the independent control of paging monitoring of the idle-state terminal device and the inactive-state terminal device, in the embodiments of the present disclosure, the paging group for the idle-state terminal device (i.e., the terminal device in the idle state) and the paging group for the inactive-state terminal device (i.e., the terminal device in the inactive state) are set separately. For example, the paging groups are respectively set according to the paging probability values of the terminal device in the idle state and the inactive state. The paging probability values of the terminal device in the idle state and the inactive state may be the same or different.

In some embodiments, the method further includes:

receiving the first group information and the second group information sent by the core network (CN);

or, receiving the first group information sent by the CN device, and receiving the second group information sent by the access network device;

or, receiving the first group information and the second group information sent by the access network device.

It can be understood that, the above operation may be: receiving the first group information and the second group information allocated by the core network (CN) device; or, receiving the first group information allocated by the CN device, and receiving the second group information allocated by the access network device; or, receiving the first group information and the second group information allocated by the access network device.

The first group information and the second group information may be allocated by the core network, or both may be allocated by the base station of the access network device, or the first group information may be allocated by the CN device, and the second group information may be allocated by the access network device.

For example, the CN device includes at least: an access management function (AMF) that can allocate paging group information for an idle state and/or an inactive state to the terminal device.

In some embodiments, the S110 may include:

monitoring the paging message according to a configuration state of an eDRX mode of the terminal device and the paging group information.

In some cases, the terminal device is only configured with the DRX mode, and one or more paging cycles are configured for the DRX mode. In some embodiments, the terminal device is configured with the eDRX mode, a paging time window (PTW) is configured in the eDRX mode, a PO corresponding to a paging cycle is configured in the PTW, and no PO corresponding to the paging cycle is configured outside the PTW.

Therefore, in the embodiment of the present disclosure, the S110 may include:

monitoring the paging message according to the configuration state of the eDRX mode of the terminal device and the paging group information.

The configuration state of the eDRX mode of the terminal device includes: the terminal device being configured with the eDRX mode and/or the terminal device being not configured with the eDRX mode.

In the embodiment of the present disclosure, the monitoring of the paging message is performed according to the configuration state of the eDRX mode and the paging group information.

For example, if the terminal device is not configured with the idle-state eDRX mode, due to the previous configuration correlation between the idle-state eDRX mode and the inactive-state eDRX mode, for example, if the terminal device is not configured with the idle-state eDRX mode, the inactive-state eDRX mode will not be configured for the terminal device; if the terminal device is configured with the idle-state eDRX mode, the terminal device may be configured with the inactive-state eDRX mode or not configured with the inactive-state eDRX mode.

The monitoring the CN device by the inactive-state terminal device may be divided into the following two manners.

First manner: the S110 may include:

monitoring the paging message on the PO of the first type according to the first group information, and monitoring the paging message on the PO of the second type according to the second group information, where the terminal device is not configured with the idle-state eDRX mode. That is, in response to that the terminal device is not configured with the idle-state eDRX mode, the paging message is monitored on the PO of the first type according to the first group information, and the paging message is monitored on the PO of the second type according to the second group information.

When the terminal device is not configured with the eDRX mode, the paging message is monitored on the PO of the first type corresponding to the idle state according to the first group information, and only the CN device paging can be monitored, which is equivalent to that the inactive-state terminal device monitors the paging message of the paging group corresponding to the idle state on the PO corresponding to the idle state. If the paging groups corresponding to the idle state and the inactive state are different, the inactive-state terminal device needs to monitor the paging message of the paging group corresponding to both the idle state and the inactive state on the PO of the first type, so that the paging message of the core network will not be missed when the state mismatch between the terminal device and the network occurs. At this time, for the inactive-state terminal device, the PO of the first type corresponding to the idle state is used to monitor the paging from the CN device, because the inactive-state terminal device also needs to monitor the paging of the CN device in the aforementioned abnormal scenario.

For example, if the CN device paging cycle of the idle state is an integer multiple of the RAN paging cycle, and the starting time of the CN paging cycle and the RAN paging cycle are aligned, then there are some POs that are both the POs of the first type and the POs of the second type. Because the terminal device monitors the paging message according to the first group information on the PO of the first type, and monitors the paging message according to the second group information on the PO of the second type, on the PO that is both the PO of the first type and the PO of the second type, the paging message is monitored according to the first group information and the second group information at the same time; while on the PO that is not the PO of the first type and is dedicated to the PO of the second type, the paging message is monitored only according to the second group information.

For example, it is assumed that the CN paging cycle is 4 times the RAN paging cycle, and the starting time of the CN paging cycle and the RAN paging cycle are aligned. Thus, it is assumed that the POs corresponding to the RAN paging cycle include: PO1, PO2, PO3 and PO4. At this time, PO4 is both the PO of the first type and the PO of the second type; it is implemented to monitor the paging message according to the first group information on the PO of the first type, and monitor the paging message according to the second group information on the PO of the second type, then, both the paging group indicated by the first group information and the paging group indicated by the second group information on PO4 have been monitored by the terminal device. On PO1 to PO3, the monitoring is only based on the second group information.

If there is no integer multiple relationship between the CN paging cycle and the RAN paging cycle and/or the starting time of the CN paging cycle and the RAN paging cycle are not aligned, PO1 to PO4 belong to the PO of the second type; and there is a PO5 that does not overlap with any PO of PO1 to PO4 in the time domain. In this case, the access network device paging is monitored according to the second group information on PO1 to PO4, and the CN device paging is monitored according to the first group information on PO5.

If monitoring is performed in this way, the paging messages monitored by the terminal device can be reduced as much as possible, and the power consumption of the terminal can be saved.

The S110 may further include:

monitoring the paging message on the PO of the first type according to the first group information and second group information, and monitoring the paging message on the PO of the second type according to the second group information. The purpose of this is that, for the inactive-state terminal device, in addition to using the second group information to monitor the paging message, the PO of the first type corresponding to the idle state is also used to monitor the paging from the CN device, so that the paging from the CN device will not be missed. This way of monitoring the paging message is applicable to a scenario where the PO of the first type and the PO of the second type do not overlap in the time domain; where the terminal device is not configured with the idle-state eDRX mode.

Second Manner:

The S110 may include:

on the PO of the first type and the PO of the second type, monitoring the paging message according to the first group information and the second group information; where the terminal device is not configured with the idle-state eDRX mode.

In the embodiments of the present disclosure, in order to simplify the behavior of the terminal device, and to realize that the terminal device needs not to determine which POs to monitor according to the first group information and which POs to monitor according to the second group information, the inactive-state terminal device performs monitoring on the PO of the first type and the PO of the second type according to the first group information and the second group information at the same time.

In this case, if the PO of the first type overlaps with the PO of the second type, this monitoring effect is equivalent to monitoring the paging message on all the POs of the second type according to the first group information and the second group information respectively.

In this case, if the PO of the first type does not overlap with the PO of the second type, this monitoring effect is equivalent to monitoring the paging message on all POs according to the first group information and the second group information respectively.

In some embodiments, if the terminal device is configured with the idle-state eDRX mode and is not configured with the inactive-state eDRX mode, the terminal device may have a PTW in the idle-state eDRX mode (i.e., the first PTW), and the CN device paging monitoring only occurs within the first PTW. Therefore, outside the first PTW, it is only necessary to monitor the paging message on the PO of the second type according to the second group information. The paging monitoring is performed on the PO of the first type within the first PTW according to the first group information, and on the PO of the second type within the first PTW, at least paging monitoring needs to be performed according to the second group information at least.

Therefore, in some embodiments, the monitoring the paging message according to the configuration state of the eDRX mode of the terminal device and the paging group information includes: in response to that the terminal device is configured with the idle-state eDRX mode and is not configured with the inactive-state eDRX mode, monitoring the paging message on the PO of the second type outside the first paging time window (PTW) according to the second group information.

Figure 5A:
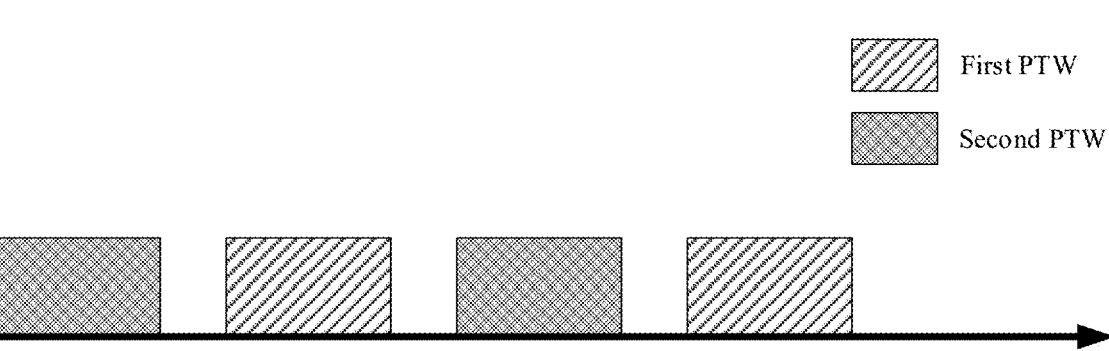
FIG. 5A is a schematic diagram showing a relative positional relationship in a time domain between a first paging time window (PTW) in an idle-state extended Discontinuous Reception (eDRX) mode and a second PTW in an inactive-state eDRX mode according to an embodiment.
Figures 5B, 5C, 6, 7:
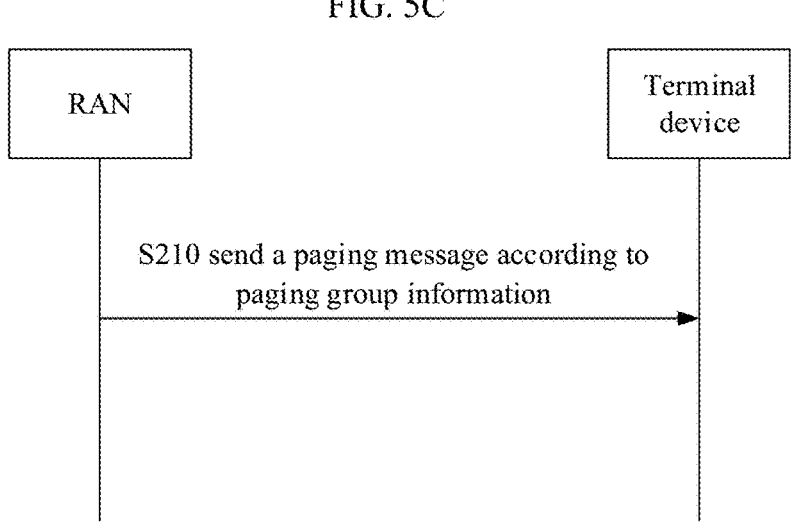
FIG. 5B is a schematic diagram showing a relative positional relationship in the time domain between the first PTW in the idle-state eDRX mode and the second PTW in the inactive-state eDRX mode according to an embodiment.
FIG. 5C is a schematic diagram showing a relative positional relationship in the time domain between the first PTW in the idle-state eDRX mode and the second PTW in the inactive-state eDRX mode according to an embodiment.
FIG. 6 is a schematic flowchart of a paging processing method according to an embodiment.
FIG. 7 is a schematic structural diagram of a paging processing apparatus according to an embodiment.

FIGS. 5A to 5C show the relative positional relationship between the first PTW and the second PTW on the time axis (time domain). FIG. 5A shows the complete separation of the first PTW and the second PTW; FIG. 5B shows the partial overlap of the first PTW and the second PTW, and FIG. 5C shows the complete overlap between the first PTW and the second PTW. FIGS. 5B and 5C show that the first PTW and the second PTW have an overlapping relationship.

The monitoring behavior within the first PTW can be further subdivided. For example, the monitoring behavior within the first PTW can be divided into two types.

First Type:

The terminal device is configured with an idle-state eDRX mode and is not configured with an inactive-state eDRX mode, in the first PTW, it monitors the paging message on the PO of the first type according to the first group information, and monitors the paging message on the PO of the second type according to the second group information.

The first PTW includes the PO of the first type and the PO of the second type. In the first PTW, paging monitoring is performed on the PO of the first type according to the first group information and paging monitoring is performed on the PO of the second type according to the second group information.

At this time, if the PO of the first type and the PO of the second type overlap, on the PO that belongs to both the PO of the first type and the PO of the second type, the paging monitoring is performed according to the first group information and the second group information at the same time; and on the dedicated PO that does not belong to the PO of the first type and only belongs to the PO of the second type, paging monitoring is performed only according to the second group information. In this way, the failure of CN device paging monitoring under abnormal condition can be reduced as much as possible, the number of paging groups to be monitored by the inactive-state terminal device is reduced as much as possible, and the power consumption is reduced as much as possible.

Second Type:

The terminal device is configured with the idle-state eDRX mode and is not configured with the inactive-state eDRX mode, within the first PTW, it monitors the paging message on the PO of the first type according to the first group information and the second group information, and monitors the paging message on the PO of the second type according to the second group information, which corresponds to a scene where the PO of the first type and the PO of the second type do not overlap.

Third Type:

The terminal device is configured with the idle-state eDRX mode and is not configured with the inactive-state eDRX mode, and monitors the paging message on the PO of the first type and the PO of the second type within the first PTW according to the first group information and the second group information.

For example, the terminal device is configured with the idle-state eDRX mode and is not configured with the inactive-state eDRX mode, on the PO of the first type and the PO of the second type within the first PTW, the paging message is monitored according to the first group information and the second group information, and on the PO of the second type outside the first PTW, the paging message is monitored according to the second group information.

The POs within the first PTW may include the PO of the first type and the PO of the second type. For the terminal device behavior, it is necessary to perform paging monitoring on the PO of the first type and the PO of the second type according to the first group information and the second group information at the same time.

If the PO of the first type and the PO of the second type within the first PTW overlap, that is, all the POs of the first type in the first PTW are still the POs of the second type, the monitoring behavior performed by the terminal device is equivalent to: performing the paging monitoring on all the POs of the second type within the first PTW according to the first group information and the second group information at the same time, while performing the paging monitoring on the PO of the second type outside the first PTW only according to the second group information.

If the PO of the first type and the PO of the second type in the first PTW do not overlap, that is, the PO of the first type is different from the PO of the second type, then the monitoring the paging message can be respectively performed on the PO of the first type and the PO of the second type in the first PTW according to the first group information and the second group information, while the monitoring the paging message on the PO of the second type outside the first PTW can be performed only according to the second group information.

In some embodiments, the terminal device is configured with both the idle-state eDRX mode and the inactive-state eDRX mode, the PTW in the idle-state eDRX mode is called the first PTW, and the PTW in the inactive-state eDRX mode is the second PTW.

Figure 4:
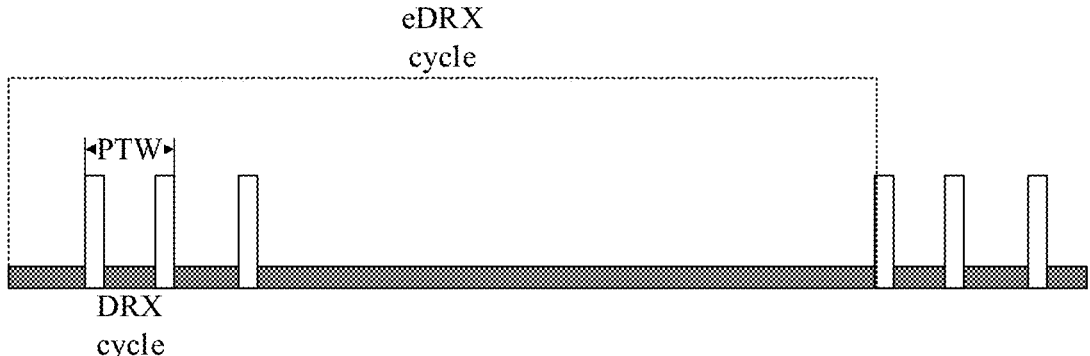
FIG. 4 is a timing sequence diagram of an e-DRX mode according to an embodiment.

As shown in FIG. 4, the eDRX mode includes an eDRX cycle, PTW is set in the eDRX cycle, PO is only set in the PTW, and PO is not set outside the PTW of the eDRX cycle.

At this time, the S110 may include at least one of the following:

monitoring the paging message on the PO of the first type within the first PTW according to the first group information, and monitoring the paging message on the PO of the second type within the second PTW according to the second group information;

in an overlapping area of the first PTW and the second PTW, monitoring the paging message on the PO of the first type within the first PTW according to the first group information and the second group information, and monitoring the paging message on the PO of the second type within the second PTW according to the first group information and the second group information; and monitoring the paging message on the PO of the first type within the first PTW outside the overlapping area of the first PTW and the second PTW according to the first group information, and monitoring the paging message on the PO of the second type within the second PTW outside the overlapping area according to the second group information;

where the first PTW is the PTW in the idle-state eDRX mode; the second PTW is the PTW in the inactive-state eDRX mode;

where the terminal device is configured with the idle-state eDRX mode and is configured with the inactive-state eDRX mode.

For the terminal device configured with both the idle-state eDRX mode and the inactive-state eDRX mode, there are three alternative monitoring manners.

First Manner:

The terminal device performs paging monitoring on the PO of the first type within the first PTW according to the first group information (at this time, the CN device paging is monitored), and performs paging monitoring on the PO of the second type within the second PTW according to the second group information (at this time, the access network device paging is monitored). At this time, the relative positional relationship between the first PTW and the second PTW in the time domain may be arbitrary. For example, the first PTW and the second PTW may be separated or overlapped. The overlapping relationship between the first PTW and the second PTW is divided into: partial overlap and complete overlap. Various POs in the respective PTWs can be monitored according to the corresponding paging group. In this way, the number of paging groups monitored by the inactive-state terminal device can be as few as possible, and the problem of omission of monitoring of abnormal CN device paging in the inactive state is solved. FIG. 5A is a schematic diagram of the separation of the first PTW and the second PTW; FIG. 5B is a schematic diagram of the first PTW and the second PTW partially overlapping; FIG. 5C is a schematic diagram of the first PTW and the second PTW completely overlapping.

In this case, if the PO of the first type contained in the first PTW overlaps with the PO of the second type contained in the second PTW, on the PO(s) belonging to both the PO of the first type and the PO of the second type, the terminal device performs the paging monitoring simultaneously according to the first group information and the second group information, but on the PO(s) included in the second PTW and belonging to only the PO of the second type, the paging monitoring is performed only according to the second group information.

If the first PTW and the second PTW overlap, but the PO of the first type and the PO of the second type thereof do not overlap, then on the PO of the first type, the terminal device may perform the paging monitoring simultaneously according to the first group information and the second group information, and perform the paging monitoring on the PO of the second type according to the second group information.

Second Manner:

In the overlapping area of the first PTW and the second PTW, the paging message is monitored on the PO of the first type within the first PTW according to the first group information and the second group information, and the paging message is monitored on the PO of the second type within the second PTW according to the first group information and the second group information; and the paging message is monitored on the PO of the first type within the first PTW outside the overlapping area of the first PTW and the second PTW according to the first group information, and the paging message is monitored on the PO of the second type within the second PTW outside the overlapping area according to the second group information;

where the terminal device is configured with the idle-state eDRX mode and is configured with the inactive-state eDRX mode.

If the first PTW and the second PTW have no overlapping area in the time domain, the terminal device performs paging monitoring on the PO of the first type within the first PTW according to the first group information, and performs paging monitoring on the PO of the second type within the first PTW according to the second group information.

If the first PTW and the second PTW have an overlapping area in the time domain, and the overlapping area does not separately and completely cover the first PTW and/or the second PTW, then the paging message is monitored on both the PO of the first type and the PO of the second type in the overlapping area according to the first group information and the second group information, while the paging monitoring is performed on the PO of the first type within the first PTW outside the overlapping area only according to the first group information, and the paging monitoring is performed on the PO of the second type in the second PTW outside the overlapping area only according to the second group information.

As shown in FIG. 6, the present disclosure provides a paging processing method, and the method includes the following steps.

In S210: a paging message is sent according to paging group information.

The embodiment of the present disclosure provides a paging processing method, which can be executed by an access network device, and specifically can be executed by a base station of the access network device. In the embodiment of the present disclosure, in order to reduce the power consumption of the terminal device, the terminal device will be grouped into paging groups, and the paging message will be sent according to the paging group information. The access network device may include at least a terminal.

For example, the S210 may include at least one of the following:

if a paging command from the CN device is received, on the PO of the idle state, sending a paging message to the idle-state terminal device according to the paging group corresponding to the paging group information for the idle-state terminal device; here the PO of the idle state is the aforementioned PO of the first type;

if the paging command from the CN device is not received, on the PO of the inactive state, that is, on the PO of the second type, sending a paging message to the inactive-state terminal device according to the paging group corresponding to the paging group information for the inactive-state terminal device; here the PO of the inactive state is the aforementioned PO of the second type;

if the access network device receives the paging command from the CN device and the paging command instructs to page the inactive-state terminal device, according to the paging group information for the inactive-state terminal device, on the PO of the second type, sending a paging message to the inactive-state terminal device on the paging group for the inactive-state terminal device;

when needing to page the inactive-state terminal device and the paging group information of the inactive state is not obtained, sending a paging message for paging the inactive-state terminal device on any paging group on the PO for the inactive-state terminal device;

if the state information of the terminal device and the paging group information are both lost, sending a paging message for paging the inactive-state terminal device on any paging group on all POs; all POs here may include: the PO of the first type and the PO of the second type.

The above is only the examples for paging according to the paging group information, and the specific implementation is not limited to the above examples.

In some embodiments, the paging group information includes at least one of the following:

a grouping identity, used to indicate the paging group where the terminal device is located;

a paging probability value, where the paging probability value has a corresponding relationship with the paging group; or a paging probability level, where the paging probability level has a corresponding relationship with the paging group.

In some embodiments, the paging group information is included in paging assistance information, where the paging assistance information further includes:

a paging cycle parameter, where the paging cycle parameter may include: the aforementioned CN paging cycle, RAN paging cycle and/or default paging cycle.

In some embodiments, the paging group information includes:

first group information for the idle-state terminal device; and second group information for the inactive-state terminal device.

The first group information indicates a paging group for the idle-state terminal device; the second group information indicates a paging group for the inactive-state terminal device. When the terminal device is in the idle state, it only needs to monitor the paging message from the core network through the first group information; and when the terminal enters the inactive state, it needs to monitor the paging message of the core network and the paging message of the access network device at the same time according to the second group information. For example, the method further includes:

sending the first group information and the second group information allocated by the core network (CN) device to the terminal device;

or, sending the first group information sent by the CN device and the second group information sent by the access network device to the terminal device;

or, sending the first group information and the second group information by the access network device.

The distribution subject of the first group information and the second group information may be the CN device or the access network device. If the AMF of the CN device allocates at least one of the first group information or the second group information; the base station of the access network device allocates at least one of the first group information or the second group information.

The paging groups pointed to by the first group information and the second group information may be the same or different.

In some embodiments, the method further includes:

allocating the first group information by the access network device, and sending the first group information to the CN device;

and/or, allocating the second group information by the access network device, and sending the second group information to the CN device.

If the access network device allocates the first group information involving the CN device paging, the first group information needs to be sent to the CN device.

If the access network device allocates the second group information, considering that the CN device may use the second group information, or considering that the second group information may be requested from the CN device if the access network device loses the second group information, although the second group information does not involve the CN device paging, the access network device may also report the second group information allocated by itself to the CN device.

In some embodiments, the S210 may include at least one of the following:

if the first group information is obtained, sending a paging message for paging the idle-state terminal device on the PO of the first type according to the first group information;

if the second group information is obtained, sending a paging message for paging the inactive-state terminal device on the PO of the second type according to the second group information;

if the second group information is not obtained, sending a paging message for paging the inactive-state terminal device on any paging group of the PO of the first type;

if a paging command for paging the terminal device in the inactive state is received from the CN device, sending the paging message for paging the terminal device in the inactive state according to the obtaining state of the second group information.

As an embodiment, the PO of the first type is the PO corresponding to the core network (CN) device paging cycle; the PO of the second type is the PO corresponding to the radio access network (RAN) paging cycle.

As an embodiment, the PO of the first type is the PO corresponding to the core network (CN) device paging cycle, where the core network (CN) device paging cycle may be the CN device paging cycle configured by the core network for the terminal, or it may be min {CN device paging cycle, default paging cycle}; the PO of the second type is the PO corresponding to the radio access network (RAN) paging cycle, where the RAN paging cycle may be the access network device paging cycle configured by the base station for the terminal, and it may also be min{CN device paging cycle, default paging cycle, access network device paging cycle}.

As an embodiment, the PO of the first type is the paging PO corresponding to the core network cycle, and all monitored POs are the PO of the second type.

As an embodiment, the PO of the first type is the PO corresponding to the CN paging cycle; the PO of the second type is the PO corresponding to the default paging cycle.

As an embodiment, the PO of the first type is a specific PO selected according to one style from all POs; the PO of the second type is all POs.

As an embodiment, the PO of the first type is a specific PO selected according to one style from all POs; the PO of the second type is the remaining PO(s). At this time, the PO of the first type and the PO of the second type do not have an overlapping part in the time domain.

In some embodiments, sending the paging message for paging the terminal device in the inactive state according to the obtaining state of the second group information if the paging command for paging the terminal device in the inactive state is received from the CN device, includes:

first solution: when receiving the paging command for paging terminal device in the inactive state from the CN device and obtaining the second group information, sending the paging message for paging the terminal device in the inactive state on the PO of the second type according to the second group information;

second solution: when receiving the paging command for paging the terminal device in the inactive state from the CN device and not obtaining the second group information, sending the paging message on any paging group on the PO of the first type;

third solution: in response to receiving the paging command for paging terminal device in the inactive state from the CN device and not obtaining second the grouping information, sending the paging message on the PO of the first type according to the first group information.

In the first solution, when the paging command for the inactive-state terminal device is received from the CN device, if the base station knows that the terminal device is currently in the inactive state and knows the second group information of the inactive-state terminal device, in order to successfully page the inactive-state terminal device, it directly pages the inactive-state terminal device on the paging group indicated by the second group information on the PO of the second type. In this case, the inactive-state terminal device does not need to monitor the PO of the first type, nor monitor the paging group indicated by the first group information on any PO. In this way, the terminal device can maintain the regular paging monitoring of the inactive-state terminal device, and then it is possible to send the CN device paging to the inactive-state terminal device. Alternatively, the base station does not need to determine the current state of the terminal device, but only delivers the paging message according to the paging group information sent by the core network, that is, the base station directly pages the inactive-state terminal device on the paging group indicated by the second group information on the PO of the second type.

In the second solution, when the paging command for paging the inactive-state terminal device is received from the CN device and the second group information is not obtained, the base station can send the paging message on any paging group on the PO of the first type, and then the inactive-state terminal device can be successfully paged. In this case, the terminal device can maintain the regular paging monitoring of the inactive-state terminal device, and it is possible to send the CN device paging to the inactive-state terminal device.

In the embodiment of the present disclosure, the inactive-state terminal device performs monitoring on any group on the PO of the first type, so that the terminal device can maintain the regular paging monitoring of the inactive-state terminal device, and then the CN device paging can be sent to the inactive-state terminal device.

In the embodiment of the present disclosure, obtaining the second group information includes: the second group information being stored locally by the base station of the access network device, or the second group information being requested by the access network device from the CN device. The second group information requested from the CN device may be the second group information allocated by the access network device and previously reported by the access network device, or may be allocated by the CN device.

In the third solution:

the base station of the access network device does not perform redundant sending, but sends the paging message on the PO of the first type according to the first group information after receiving the paging command for paging the inactive-state terminal device from the CN device.

The first solution and the third solution may be combined to work together. That is, the first grouping parameter is received from the core network, and the second grouping parameter is also received, then the paging message is sent on the PO of the first type according to the first group information and the paging message is sent on the PO of the second type according to the second group information, and the inactive-state terminal device performs redundant monitoring as needed.

In some embodiments, the obtaining the second group information includes at least one of the following:

storing the second group information by the access network device;

or receiving the second group information from the CN device.

For example, if the second group information is allocated by the base station itself, the base station may store the second group information by itself. If the second group information is allocated by the CN device, the CN device may distribute the second group information to the base station in advance after allocating the second group information, so the base station also stores the second group information.

In another case, the second group information is allocated by the CN device, or, the second group information is allocated by the access network device itself but is lost locally, then the second group information needs to be obtained from the CN device.

For example, the base station may request the second group information from the CN device by sending a request, or the CN device may actively deliver the second group information.

For example, the receiving the second group information from the CN device includes: receiving the second group information carried by the paging command from the CN device.

At this time, the base station receives the second group information upon receiving the paging command, and the second group information is carried in the paging command, so that the base station can send a paging message to the terminal device according to the second group information carried in the paging command; the paging message does not include the second group information.

In the embodiment of the present disclosure, when the terminal device is in an inactive state, the terminal device needs to monitor core network paging (CN paging) and radio access network paging (RAN paging) at the same time. In this case, CN paging is only used in the special case where the network and the terminal device are in a mismatch. For example, the context of the terminal device may be lost on the network side, and the network considers that the terminal device is already in the idle state and initiates CN paging. At this time, from the perspective of the terminal device, the terminal device is still in the inactive state; while from the perspective of the network, the terminal device is already in the idle state.

It is worth noting that: whether it is CN paging or RAN paging, the base station will send a paging message carrying the paged terminal device on the paging channel. Therefore, from the perspective of the terminal device, the paging messages of the CN paging and the paging message of the access network device paging may be the same.

For the inactive-state terminal device, the grouping ID of its paging group may be assigned by the base station. For the idle-state terminal device, its grouping ID is likely to be allocated by the core network. For example, the core network assigns an ID1 of a paging group to the terminal device in the idle state, and when the terminal device enters the inactive state, the base station assigns an ID2 of a paging group to a user in the inactive state. Under normal circumstances, if the aforementioned mismatch does not occur, the base station sends a paging message to the terminal device according to the grouping ID2, and the terminal device monitors two types of paging under the ID2 of the paging group. However, once the context of the terminal device may be lost on the network side (the grouping ID2 maintained by the base station will no longer exist), the network thinks that the terminal device is already in the idle state, so it initiates CN paging, then the base station will page by using the grouping ID1 carried in the paging command delivered by the core network, while the terminal device still monitors the group by using the grouping ID2, which will result in a situation where paging is lost.

In view of the above phenomenon, the embodiments of the present disclosure provide a paging group-based approach during paging to solve the processing of paging monitoring when the states of the terminal device maintained by the base station and the core network are inconsistent.

The embodiments of the present disclosure provide a method of user grouping during paging to solve the processing of paging monitoring when the states of the terminal device maintained by the base station and the core network are inconsistent.

The state of the terminal device here may at least include: the aforementioned idle state and/or inactive state. A terminal device in an idle state is referred to as an idle-state terminal device for short; and a terminal device in an inactive state is referred to as an inactive-state terminal device for short.

The embodiments of the present disclosure provide a mechanism for protecting the monitoring of the paging message for the inactive-state terminal device in a paging group manner.

The paging group information is provided or allocated by the network (the base station or core network), and its purpose is for the terminal device to determine the monitored group when monitoring the paging message. Here, the network side provides the paging group information to the terminal device, and when the terminal device is in the inactive state and/or the idle state, according to the paging group information, the terminal device monitors the paging from the network side on the paging sub-channel or paging resource corresponding to the paging group on the PO, so that compared with monitoring the entire paging channel or all paging resources of one PO, it can reduce the power consumption generated by the terminal device for monitoring the paging message, thereby saving the power consumption of the terminal device and prolonging the standby time of the terminal device.

When the terminal device is in the idle state, the network may send the paging message to the idle-state device according to the idle-state paging group information, and when the terminal enters the inactive state, the network may send the paging message to the inactive-state device according to the inactive-state paging group information. However, in the inactive state, the state stored by the network may be inconsistent with the actual state of the terminal device, that is, the network considers the terminal device to be in the idle state, and sends the paging message for the idle-state terminal device still according to the idle-state paging group information; while the terminal device is still in the inactive state, and monitors the paging message sent by the network for the inactive-state terminal device according to the inactive-state paging group information (that is, the terminal does not know the occurrence of the abnormality). That is, the terminal device in the inactive state needs to simultaneously monitor the paging message sent by the network for the idle-state terminal device according to the paging group information of the idle state and the paging message sent by the network for the inactive-state terminal device according to the paging group information of the inactive state. The present disclosure provides a mechanism for an inactive-state user to monitor the first group information for the idle-state terminal device sent by the network and/or the second group information for the inactive-state terminal device sent by the network in the inactive state.

As an embodiment, the paging group information provided or allocated by the network may be the grouping ID of a specifically allocated paging group.

As an embodiment, the paging group information provided or allocated by the network is a paging probability value determined by the network.

As an embodiment, the paging group information provided or allocated by the network is a paging probability indication determined by the network.

The paging probability indication may be the level in which the paging probability value is located (the paging probability level) or the probability value interval of the paging probability value in which the paging probability value is located. The paging probability level may include at least two levels. For example, the paging probability level may include three levels, which are respectively a medium level, a high level, and a low level; and the paging probability value corresponding to the medium level is between the paging probability values corresponding to the high level and the low level. The paging probability value corresponding to the high level is higher than the paging probability value corresponding to the low level. For example, the paging probability level may further include 4 levels, which are the first to fourth levels, respectively, and the paging probability values corresponding to the first to fourth levels increase sequentially.

It can be understood that the network provides or allocates the paging group information for monitoring different types of paging messages.

The first manner: the core network allocates parameters for paging of the terminal device in the idle state and the terminal device in the inactive state respectively; the allocated parameters at least include the aforementioned paging group. In some embodiments, the allocated parameters may further include: a paging cycle and/or a paging resource, and the like.

As an embodiment, the core network provides or allocates the paging group information for the CN device paging when it is in the idle state before entering the inactive state.

As an embodiment, the core network allocates the paging group information to the inactive-state terminal device for simultaneous access network device paging+CN device paging of the inactive-state terminal device.

At this time, the allocated paging group information may be carried in the Core Network Assistance Information for RRC INACTIVE.

The core network may assign the same or different paging group information to the idle-state terminal device and the inactive-state terminal device, and the same paging group information is taken for an example, that is, the core network assigns the same grouping ID to the two states.

The core network and the base station respectively allocate the paging group information for paging of the idle-state terminal device and the inactive-state terminal device.

As an embodiment, the core network provides or allocates the paging group information for CN paging when the terminal device is in the idle state before entering the inactive state. The paging group information delivered by the core network to the idle state may be carried in the information exchanged in the attach process of the terminal device.

As an embodiment, the base station provides or allocates the paging group information for simultaneous access network device paging and core network paging of the inactive-state terminal device.

At this time, the base station may use the assistance information provided by the core network when allocating the information, and the allocated paging group information may be carried in the inactive-state core network assistance information (Core Network Assistance Information for RRC INACTIVE).

An embodiment is: the base station directly uses the paging group information provided by the core network for paging monitoring of the inactive-state terminal device.

The core network and the base station may allocate the same or different paging group information for the idle-state terminal device and the inactive-state terminal device; for example, for the convenience of control, the core network and/or the base station may allocate the same paging group information for the idle-state terminal device and the inactive-state terminal device.

In one embodiment, the base station allocates paging for the idle-state terminal device and the inactive-state terminal device respectively.

As an embodiment, the base station provides or allocates the paging group information for CN paging of the idle-state terminal device; and saves it in the core network when the terminal device is released.

As an embodiment, the base station provides or allocates the paging group information for RAN paging and CN paging of the inactive-state terminal device.

At this time, the base station may use the assistance information provided by the core network when allocating the paging group information, and the allocated paging group information may be carried in the Core Network Assistance Information for RRC INACTIVE.

In one embodiment, the base station directly uses the paging group information provided by the core network for paging monitoring of the inactive-state terminal device.

In one embodiment, the base station may allocate the same or different paging group information to the idle-state terminal device and the inactive-state terminal device.

In one embodiment, when the network allocates different paging group information for the idle-state terminal device and the inactive-state terminal device, the aforementioned mismatch occurs, which needs to be handled according to the following first manner or second manner.

First Manner:

The terminal device performs redundant reception of the paging message transmitted on the paging group to avoid missing the paging message transmitted on the paging group.

At this time, the base station only transmits the paging message on the corresponding paging group based on one piece of paging group information to wake up the terminal device. For example, the base station transmits the paging message on the original paging group, due to mismatch (the terminal device fails to receive the paging), the base station transmits the paging message on a paging group 2.

For example, if the idle-state eDRX mode is not configured, the mechanism of monitoring the paging message by the terminal device in the paging group mode is as follows:

at the PO moment only corresponding to the access network device paging cycle, monitoring the paging message according to the paging group information provided or allocated by the network for the inactive-state terminal device.

As an embodiment, if the base station provides or allocates a paging group 1 (group1), the terminal device monitors the paging message according to the paging group 1.

On the PO corresponding to the terminal device paging cycle (specific cycle) configured by the CN device, the paging message is monitored according to the paging group information of the inactive-state terminal device provided or allocated by the network and the paging group information of the idle-state terminal device provided or allocated by the network at the same time.

As an embodiment, if the base station provides or allocates a paging group 1 (group1), and the core network provides or allocates a paging group 2 (Group2), the terminal device needs to monitor the paging message according to the paging group 1 and paging group 2 at the same time.

As an embodiment, at all POs, paging message monitoring is performed according to the inactive-state paging group information provided or allocated by the network and the paging group information of the idle state provided or allocated by the network at the same time. All POs here can be: POs corresponding to the idle-state paging cycle and POs corresponding to the inactive-state paging cycle. Compared with the above method of distinguishing POs, this method is relatively simple.

In some embodiments, if only the idle-state eDRX mode is configured, the mechanism of monitoring the paging message by the terminal device in the paging group mode is as follows:

outside the PTW window of the idle-state eDRX mode, performing paging message monitoring according to the paging group information provided or allocated by the network for the inactive state;

within the PTW window in the idle-state eDRX mode, performing paging message monitoring according to the following mechanisms.

First Mechanism:

paging message monitoring is performed on all POs simultaneously according to the paging group information of the inactive-state terminal device provided or allocated by the network and the paging group information of the idle-state terminal device provided or allocated by the network.

Second Mechanism:

within the PTW window, there are two cases:

first case: on the PO moment only corresponding to the access network device paging cycle, monitoring the paging message according to the paging group information of the inactive-state terminal device provided or allocated by the network;

second case: on the PO corresponding to the terminal device paging cycle (specific cycle) configured by the CN device, monitoring the paging message according to the paging group information of the inactive-state terminal device provided or allocated by the network and the paging group information of the idle-state terminal device provided or allocated by the network at the same time.

In some embodiments, if the idle-state eDRX mode and the inactive-state eDRX mode are configured, the mechanism of monitoring the paging message by the terminal device in the paging group mode is as follows.

In the PTW window corresponding to the inactive-state eDRX mode, paging message monitoring is performed according to the paging group information of the inactive-state terminal device provided or allocated by the network.

When the PTW windows corresponding to the inactive-state eDRX mode and the idle-state eDRX mode overlap, in the overlapping time period, the terminal device needs to monitor the CN device paging according to the paging group information of the idle-state terminal device, and at the same time monitor the access network device paging according to the paging group information of the inactive-state terminal device.

In the PTW window, paging monitoring can be performed as follows.

First Option:

Paging message monitoring is performed on all POs simultaneously according to the paging group information of the inactive-state terminal device provided or allocated by the network and the paging group information of the idle-state terminal device provided or allocated by the network.

Second Option:

In the PTW window, there are two cases:

First case: at the PO moment only corresponding to the access network device paging cycle, the paging message is monitored according to the paging group information of the inactive-state terminal device provided or allocated by the network.

Second case: on the PO corresponding to the idle-state paging cycle (terminal device specific cycle) configured by the CN device, paging message monitoring is performed according to the paging group information of the inactive-state terminal device provided or allocated by the network and the paging group information of the idle-state terminal device provided by allocated by the network at the same time.

In the PTW window of the idle-state eDRX mode, only CN device paging may be monitored. For example, in the PTW window, paging message monitoring is performed only according to the paging group information of the idle-state terminal device provided or allocated by the network.

Second manner: the base station sends a redundant paging message.

The base station sending the redundant paging message may be as follows:

if the base station receives the paging message from the core network, for the terminal device, in addition to sending the paging message according to the paging group information of the idle-state terminal device provided or allocated by the network, it can also send an additional paging message.

First case: blind sending mode: the paging message is sent on all paging groups. For example, assuming that the base station has a total of 4 paging groups, it is necessary to send the paging message of the terminal device on all the paging groups. Because there is a mismatch at this time, that is, the inactive-state terminal device originally receives on the paging group 1, but the paging message sent by the CN device is the paging group 2, the base station does not know which group the terminal device is in, and an alternative way is that the paging message for paging the terminal device is sent on each paging group.

Second case: if the paging message of the core network is additionally attached with the paging group information of the inactive-state terminal device provided or allocated by the network, the paging message may be sent according to the paging group information of the inactive-state terminal device provided or allocated by the network, or the paging message may be sent according to the paging group information of the inactive-state terminal device provided or allocated by the network and the paging group information of the idle-state terminal device provided or allocated by the network. In the former situation, the core network only delivers a set of paging parameters, that is, the paging group information of the inactive-state terminal device; while in the latter situation, the core network provides the paging group information of the inactive-state terminal device and the paging group information of the idle-state terminal device at the same time. The latter means that the base station performs redundant sending.

As shown in FIG. 7, an embodiment of the present disclosure provides a paging processing apparatus, where the apparatus includes:

a monitoring module 110, configured to monitor a paging message according to paging group information.

In some embodiments, the monitoring module 110 includes: a program module; after the program module is executed by the processor, the monitoring of the paging message based on the paging group information can be implemented.

In other embodiments, the monitoring module 110 further includes: a software-hardware combination module; the software-hardware combination module includes but is not limited to: various programmable arrays; the programmable array includes but is not limited to: a complex programmable array and/or a field programmable array.

In still other embodiments, the monitoring module 110 includes but is not limited to: a pure hardware module; the pure hardware module includes but is not limited to: an application specific integrated circuit.

In some embodiments, the monitoring module 110 is configured to monitor the paging message on a paging occasion (PO) of a first type and a PO of a second type according to the paging group information, where the PO of the first type is the PO corresponding to the core network (CN) device paging cycle; the PO of the second type is the PO corresponding to the radio access network (RAN) paging cycle.

In some embodiments, the paging group information includes at least one of the following:

a grouping identity, used to indicate a paging group where the terminal device is located;

a paging probability value, where the paging probability value has a corresponding relationship with the paging group; or a paging probability level, where the paging probability level has a corresponding relationship with the paging group.

In some embodiments, the paging group information includes:

first group information for an idle-state terminal device; and second group information for an inactive-state terminal device.

In some embodiments, the apparatus further includes:

a first receiving module, configured to receive the first group information and the second group information;

where the first group information and the second group information are allocated by a core network device;

or, the first group information is allocated by the core network device, and the second group information is allocated by an access network device;

or, the first group information and the second group information are allocated by the access network device.

In some embodiments, the monitoring module 110 is configured to monitor the paging message according to a configuration state of an eDRX mode of the terminal device and the paging group information.

In some embodiments, the monitoring module 110 is specifically configured to perform at least one of the following:

monitoring the paging message on the PO of the first type according to the first group information, and monitoring the paging message on the PO of the second type according to the second group information;

monitoring the paging message on the PO of the first type and the PO of the second type according to the first group information and the second group information;

where the terminal device is not configured with an idle-state eDRX mode.

In some embodiments, the monitoring module 110 is configured to monitor the paging message on the PO of the second type outside the first paging time window (PTW) according to the second group information; where the first PTW is the PTW in the idle-state eDRX mode, where the terminal device is configured with the idle-state eDRX mode and is not configured with the inactive-state eDRX mode.

In some embodiments, the monitoring module 110 is configured to perform at least one of the following:

monitoring the paging message on the PO of the first type according to the first group information, and monitoring the paging message on the PO of the second type according to the second group information;

on the PO of the first type and the PO of the second type in the first PTW, monitoring the paging message according to the first group information and the second group information;

where the first PTW is the PTW in the idle-state eDRX mode;

the terminal device is configured with the idle-state eDRX mode and is not configured with the inactive-state eDRX mode.

In some embodiments, the monitoring module 110 is further configured to perform at least one of the following:

monitoring the paging message on the PO of the first type within the first PTW according to the first group information, and monitoring the paging message according to the second group information on the PO of the second type within the second PTW;

in an overlapping area of the first PTW and the second PT, monitoring the paging message on the PO of the first type within the first PTW according to the first group information and the second group information, and monitoring the paging message on the PO of the second type within the second PTW according to the first group information and the second group information; and monitoring the paging message on the PO of the first type within the first PTW outside the overlapping area of the first PTW and the second PTW according to the first group information, and monitoring the paging message on the PO of the second type within the second PTW outside the overlapping area according to the second group information;

where the first PTW is the PTW in the idle-state eDRX mode; the second PTW is the PTW in the inactive-state eDRX mode;

the terminal device is configured with the idle-state eDRX mode and configured with the inactive-state eDRX mode.

Figures 8, 9:
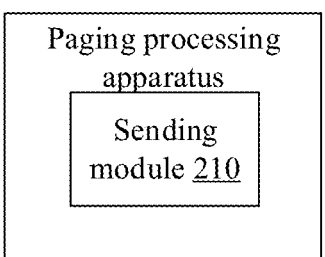
FIG. 8 is a schematic structural diagram of a paging processing apparatus according to an embodiment.
FIG. 9 is a schematic structural diagram of a terminal device according to an embodiment.
Figure 10:
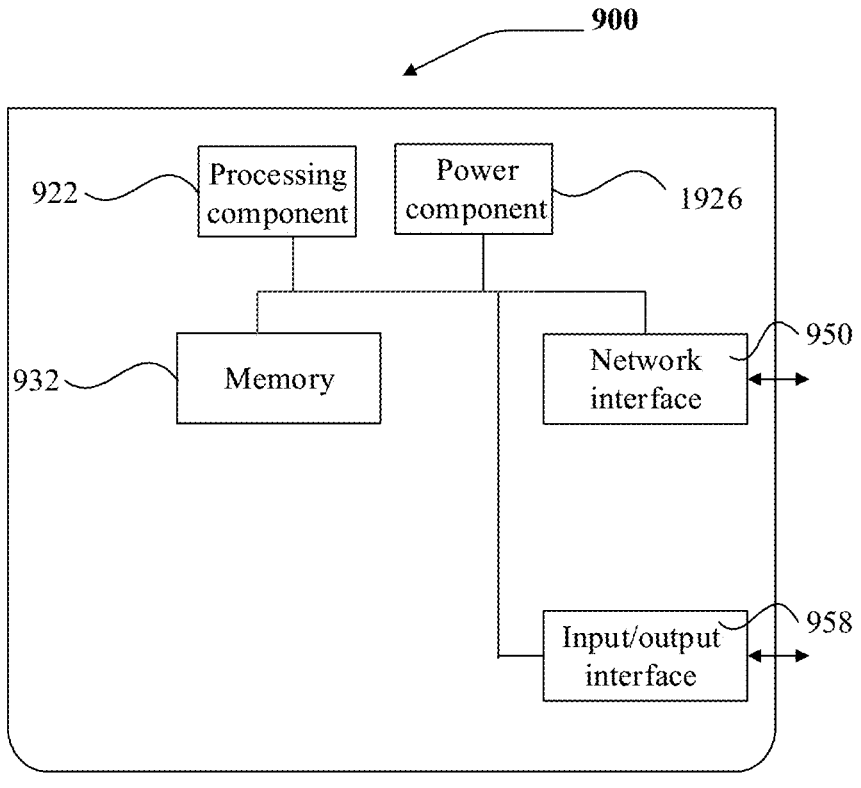
FIG. 10 is a schematic structural diagram of a base station according to an embodiment.

As shown in FIG. 8, an embodiment of the present disclosure provides a paging processing apparatus, where the apparatus includes:

a sending module 210, configured to send a paging message according to paging group information.

In some embodiments, the sending module 210 includes: a program module; after the program module is executed by a processor, the monitoring of the paging message based on the paging group information can be implemented.

In some embodiments, the sending module 210 further includes: a software-hardware combination module; the software-hardware combination module includes but is not limited to: various programmable arrays; the programmable array includes but is not limited to: a complex programmable array and/or a field programmable array.

In still other embodiments, the monitoring module includes but is not limited to: a pure hardware module; the pure hardware module includes but is not limited to: an application specific integrated circuit.

In some embodiments, the sending module 210 is configured to monitor the paging message on the paging occasion (PO) of the first type and the PO of the second type according to the paging group information.

In some embodiments, the paging group information includes at least one of the following:

a grouping identity, used to indicate a paging group where the terminal device is located;

a paging probability value, where the paging probability value has a corresponding relationship with the paging group; or a paging probability level, where the paging probability level has a corresponding relationship with the paging group.

In some embodiments, the paging group information is included in paging assistance information, where the paging assistance information further includes:

a paging cycle parameter, where the paging cycle parameter may include: the aforementioned CN paging cycle, RAN paging cycle and/or default paging cycle.

In some embodiments, the paging group information includes:

first group information for the idle-state terminal device; and second group information for the inactive-state terminal device.

In some embodiments, the sending module 210 is further configured to send the first group information and the second group information sent by the core network (CN) device; or, send the first group information sent by the CN device and the second group information sent by the access network device; or send the first group information and the second group information sent by the access network device.

In some embodiments, the sending module 210 is further configured to send the first group information and the second group information;

where the first group information and the second group information are allocated by the core network device;

or, the first group information is allocated by the core network device, and the second group information is allocated by the access network device;

or, the first group information and the second group information are allocated by the access network device.

In some embodiments, the sending module is further configured to send the first group information to the CN device when the first group information is allocated by the access network device;

and/or, send the second group information to the CN device when the second group information is allocated by the access network device.

In some embodiments, the sending module 210 is configured to perform at least one of the following:

when the first group information is obtained, sending a paging message for paging the idle-state terminal device on the PO of the first type according to the first group information;

when the second group information is obtained, sending a paging message for paging the inactive-state terminal device on the PO of the second type according to the second group information;

when the second group information is not obtained, sending the paging message for paging the inactive-state terminal device on any paging group of the PO of the first type;

when a paging command for paging the terminal device in the inactive state is received from the CN device, sending the paging message for paging the terminal device in the inactive state according to the obtaining state of the second group information.

In some embodiments, the sending module 210 is configured to perform at least one of the following:

when the paging command for paging the terminal device in the inactive state is received from the CN device and the second group information is obtained, sending the paging message for paging the terminal device in the inactive state on the PO of the second type according to the second group information;

when the paging command for paging the terminal device in the inactive state is received from the CN device and the second group information is not obtained, sending the paging message on any paging group on the PO of the second type;

when the paging command for paging the terminal device in the inactive state is received from the CN device and the second group information is not obtained, sending the paging message on the PO of the first type according to the first group information.

In some embodiments, the obtaining the second group information includes at least one of the following:

the access network device storing the second group information;

receiving the second group information from the CN device.

In some embodiments, the apparatus further includes:

a receiving module, configured to receive the second group information carried by the paging command from the CN device.

Embodiments of the present disclosure provide a communication device, including:

a memory for storing instructions executable by a processor;

the processor connected to the memory;

where the processor is configured to execute the terminal control method and/or the information processing method provided by any of the foregoing technical solutions.

The processor may include various types of storage media, which are non-transitory computer storage media that can continue to memorize information stored thereon after the communication device is powered down.

Here, the communication device includes: an access device or a terminal device or a core network device.

The processor may be connected to the memory through a bus or the like, for reading executable programs stored on the memory, for example, at least one of the methods shown in FIG. 2, FIG. 3, or FIG. 6.

FIG. 8 is a block diagram of a terminal device 800 according to an embodiment of the present disclosure. The terminal device 800 may be a mobile phone, a computer, a digital broadcast terminal, a messaging device, a gaming console, a tablet, a medical device, exercise equipment, a personal digital assistant, and the like.

Referring to FIG. 8, the terminal device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal device 800. Examples of such data include instructions for any applications or methods operated on the terminal device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device 800. The power component 806 may include a power management system, one or more power sources, and any other components associated with the generation, management, and distribution of power in the terminal device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal device 800. For instance, the sensor component 814 may detect an open/closed status of the terminal device 800, relative positioning of components, e.g., the display and the keypad, of the terminal device 800, a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal device 800 and other devices. The terminal device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more embodiments, the terminal device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In one or more embodiments, there is also provided a non-transitory computer-readable storage medium including instructions, such as included in the memory 804, executable by the processor 820 in the terminal device 800, for performing the above-described methods. For example, the non-transitory computer-readable storage medium may be a ROM, a RAM, a CD-ROM, a magnetic tape, a floppy disc, an optical data storage device, and the like.

As shown in FIG. 9, an embodiment of the present disclosure shows a structure of an access device. For example, the base station 900 may be provided as a network-side device. The communication device may be the aforementioned access device and/or core network device.

Referring to FIG. 9, the base station 900 includes a processing component 922 that further includes one or more processors, and memory resources represented by a memory 932 for storing instructions executable by the processing component 922, such as application programs. The application programs stored in the memory 932 may include one or more modules each corresponding to a set of instructions. Further, the processing component 922 is configured to execute the instructions to perform any of the above described methods applied to the access device, for example, at least one of the methods shown in FIG. 2, FIG. 3, or FIG. 6.

The base station 900 may also include a power component 926 configured to perform power management of the base station 900, wired or wireless network interface(s) 950 configured to connect the base station 900 to a network, and an input/output (I/O) interface 958. The base station 900 may operate based on an operating system stored in the memory 932, such as Windows Server™, Mac OS X™, Unix™, Linux™, FreeBSD™, or the like.

Other embodiments of the present disclosure will be apparent to those skilled in the art from consideration of the specification and practice of the present disclosure. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A paging processing method, comprising:

monitoring, by a terminal device, a paging message according to paging group information, wherein the terminal device is in an inactive state; the paging group information comprises: first group information for an idle-state terminal device; and second group information for an inactive-state terminal device;

wherein monitoring the paging message according to the paging group information comprises:

in response to a first paging time window (PTW) and a second PTW overlapping, and a paging occasion (PO) of a first type and a PO of a second type not overlapping, performing, by the terminal device, paging monitoring on the PO of the first type according to both the first group information and the second group information, and performing, by the terminal device, paging monitoring on the PO of the second type according to the second group information;

wherein the terminal device is configured with an idle-state extended Discontinuous Reception (eDRX) mode and an inactive-state eDRX mode, wherein the first PTW is a PTW in the idle-state eDRX mode, and the second PTW is a PTW in the inactive-state eDRX mode; and wherein the PO of the first type corresponds to an idle state, and the PO of the second type corresponds to an inactive state.

2. The method according to claim 1, wherein monitoring the paging message according to the paging group information comprises:

monitoring the paging message on the PO of the first type and the PO of the second type according to the paging group information.

3. The method according to claim 1, wherein the paging group information comprises at least one of following information:

a grouping identity, used to indicate a paging group where the terminal device is located;

a paging probability value, wherein the paging probability value has a corresponding relationship with the paging group; and a paging probability level, wherein the paging probability level has a corresponding relationship with the paging group.

4. The method according to claim 1, further comprising:

receiving the first group information and the second group information;

wherein the first group information and the second group information are allocated by a core network device; or, the first group information is allocated by the core network device, and the second group information is allocated by an access network device; or, the first group information and the second group information are allocated by the access network device.

5. The method according to claim 1, wherein the monitoring the paging message according to the paging group information comprises:

monitoring the paging message according to a configuration state of an eDRX mode of the terminal device and the paging group information.

6. The method according to claim 5, wherein monitoring the paging message according to the configuration state of the eDRX mode of the terminal device and the paging group information comprises at least one of following acts:

monitoring the paging message on the PO of the first type according to the first group information, and monitoring the paging message on the PO of the second type according to the second group information; or monitoring the paging message on the PO of the first type and the PO of the second type according to the first group information and the second group information;

wherein the terminal device is not configured with the idle-state eDRX mode.

7. The method according to claim 5, wherein monitoring the paging message according to the configuration state of the eDRX mode of the terminal device and the paging group information comprises:

monitoring the paging message on the PO of the second type outside the first PTW according to the second group information;

wherein the terminal device is configured with the idle-state eDRX mode and is not configured with the inactive-state eDRX mode.

8. The method according to claim 5, wherein monitoring the paging message according to the configuration state of the eDRX mode of the terminal device and the paging group information comprises at least one of following acts:

within the first PTW, monitoring the paging message on the PO of the first type according to the first group information, and monitoring the paging message on the PO of the second type according to the second group information; or within the first PTW, monitoring the paging message on the PO of the first type and the PO of the second type according to the first group information and the second group information;

wherein the terminal device is configured with the idle-state eDRX mode and is not configured with the inactive-state eDRX mode.

9. The method according to claim 5, wherein monitoring the paging message according to the configuration state of the eDRX mode of the terminal device and the paging group information, further comprises at least one of following acts:

monitoring the paging message on the PO of the first type within the first PTW according to the first group information, and monitoring the paging message on the PO of the second type within the second PTW according to the second group information; or in an overlapping area of the first PTW and the second PTW, monitoring the paging message on the PO of the first type within the first PTW according to the first group information and the second group information, and monitoring the paging message on the PO of the second type within the second PTW according to the first group information and the second group information; and monitoring the paging message on the PO of the first type within the first PTW outside the overlapping area of the first PTW and the second PTW according to the first group information, and monitoring the paging message on the PO of the second type within the second PTW outside the overlapping area according to the second group information;

wherein the terminal device is configured with the idle-state eDRX mode and is configured with the inactive-state eDRX mode.

10. A non-transitory computer storage medium storing a program, wherein the program, when executed by a processor, causes the processor to perform acts according to claim 1.

11. A paging processing method, comprising:

sending a paging message according to paging group information; wherein the paging group information comprises: first group information for an idle-state terminal device; and second group information for an inactive-state terminal device;

wherein in response to a first paging time window (PTW) and a second PTW overlapping, and a paging occasion (PO) of a first type and a PO of a second type not overlapping, the first group information and the second group information are both configured for preforming paging monitoring on the PO of the first type by a terminal device, and the second group information is further configured for preforming paging monitoring on the PO of the second type by the terminal device;

wherein the terminal device is in an inactive state, and the terminal device is configured with an idle-state extended Discontinuous Reception (eDRX) mode and an inactive-state eDRX mode; wherein the first PTW is a PTW in the idle-state eDRX mode, and the second PTW is a PTW in the inactive-state eDRX mode; and wherein the PO of the first type corresponds to an idle state and the PO of the second type corresponds to an inactive state.

12. The method according to claim 11, further comprising;

sending the first group information and the second group information;

wherein the first group information and the second group information are allocated by a core network device; or the first group information is allocated by the core network device, and the second group information is allocated by an access network device; or the first group information and the second group information are allocated by the access network device.

13. The method according to claim 12, further comprising at least one of following acts:

sending the first group information to the core network device, wherein the first group information is allocated by the access network device; or, sending the second group information to the core network device, wherein the second group information is allocated by the access network device.

14. The method according to claim 11, wherein sending the paging message according to the paging group information comprises at least one of following acts:

obtaining the first group information, and sending a paging message for paging the idle-state terminal device on the PO of the first type according to the first group information;

obtaining the second group information, and sending a paging message for paging the inactive-state terminal device on the PO of the second type according to the second group information;

without obtaining the second group information, sending the paging message for paging the inactive-state terminal device on any paging group of the PO of the first type;

receiving a paging command for paging the inactive-state terminal device from a core network (CN) device, and sending the paging message for paging the inactive-state terminal device according to an obtaining state of the second group information.

15. The method according to claim 14, wherein obtaining the second group information comprises at least one of following acts:

the access network device storing the second group information; or receiving the second group information from the CN device.

16. A paging processing apparatus, wherein the apparatus comprises:

a processor, a transceiver, a memory, and a program stored on the memory and executable by the processor, wherein when executing the program, the processor is configured to perform acts according to claim 11.

17. A non-transitory computer storage medium storing a program, wherein the program, when executed by a processor, causes the processor to perform acts according to claim 11.

18. A paging processing apparatus, comprising:

a processor, a transceiver, a memory, and a program stored on the memory and executable by the processor, wherein when executing the program, the processor is configured to monitor a paging message according to paging group information; wherein the apparatus is in an inactive state; the paging group information comprises: first group information for an idle-state terminal device; and second group information for an inactive-state terminal device;

wherein the processor is further configured to:

in response to a first paging time window (PTW) and a second PTW overlapping, and a paging occasion (PO) of a first type and a PO of a second type not overlapping, perform paging monitoring on the PO of the first type according to both the first group information and the second group information, and perform paging monitoring on the PO of the second type according to the second group information;

wherein the terminal device is configured with an idle-state extended Discontinuous Reception (eDRX) mode and an inactive-state eDRX mode, wherein the first PTW is a PTW in the idle-state eDRX mode, and the second PTW is a PTW in the inactive-state eDRX mode; and wherein the PO of the first type corresponds to an idle state, and the PO of the second type corresponds to an inactive state.

* * * * *